(12) United States Patent
Owejan et al.

(10) Patent No.: US 8,430,985 B2
(45) Date of Patent: Apr. 30, 2013

(54) MICROPOROUS LAYER ASSEMBLY AND METHOD OF MAKING THE SAME

(75) Inventors: Jeanette E. Owejan, Honeoye, NY (US); Hubert A. Gasteiger, Livorno (IT)

(73) Assignee: GM Global Technology Operations LLC, Detroit, MI (US)

( * ) Notice: Subject to any disclaimer, the term of this patent is extended or adjusted under 35 U.S.C. 154(b) by 303 days.

(21) Appl. No.: 11/972,865

(22) Filed: Jan. 11, 2008

(65) Prior Publication Data

US 2009/0181235 A1     Jul. 16, 2009

(51) Int. Cl.
 B44C 1/17 (2006.01)
(52) U.S. Cl.
 USPC ......... 156/235; 156/239; 156/289; 156/307.3
(58) Field of Classification Search .................. 156/235, 156/289, 239, 307.3
See application file for complete search history.

(56) References Cited

U.S. PATENT DOCUMENTS

| | | | |
|---|---|---|---|
| 5,981,097 A | 11/1999 | Rajendran | |
| 6,524,736 B1* | 2/2003 | Sompalli et al. | 429/42 |
| 7,043,203 B2 | 5/2006 | Miquel et al. | |
| 2002/0142205 A1* | 10/2002 | Kim et al. | 429/32 |
| 2005/0227140 A1* | 10/2005 | Beckmann et al. | 429/44 |
| 2006/0105159 A1* | 5/2006 | O'Hara et al. | 428/318.6 |
| 2006/0183011 A1 | 8/2006 | Mittelsteadt et al. | 429/30 |
| 2006/0204831 A1* | 9/2006 | Yan et al. | 429/42 |
| 2007/0111070 A1* | 5/2007 | Carlson | 429/32 |
| 2007/0199649 A1 | 8/2007 | Sompalli et al. | |
| 2007/0213203 A1 | 9/2007 | Sompalli et al. | |
| 2007/0278094 A1* | 12/2007 | Lousenberg | 204/280 |

FOREIGN PATENT DOCUMENTS

| | | |
|---|---|---|
| EP | 1780822 | 2/2007 |
| WO | 03009410 | 1/2003 |
| WO | 2005057683 | 6/2005 |

* cited by examiner

*Primary Examiner* — Mark A Osele
*Assistant Examiner* — Nickolas Harm
(74) *Attorney, Agent, or Firm* — BrooksGroup

(57) ABSTRACT

One embodiment includes a process including coating a first microporous layer onto a first decal and curing the first microporous layer and the first decal.

26 Claims, 4 Drawing Sheets

MICROPOROUS LAYER ASSEMBLY AND METHOD OF MAKING THE SAME

TECHNICAL FIELD

The field to which the disclosure generally relates includes fuel cell layers including microporous layers and products including the same and methods of making the same.

BACKGROUND

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen-rich gas or pure hydrogen and the cathode receives oxygen or air. The hydrogen gas is oxidized in the anode to generate protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work may be used to operate a vehicle, for example.

Proton exchange membrane (PEM) fuel cells are popular for vehicle applications. The PEM fuel cell generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture, and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. The fuel cell stack includes a series of flow field or bipolar plates positioned between the MEAs in the stack. The bipolar plates include an anode side and a cathode side for adjacent fuel cells in the stack. The fuel cell stack receives an anode hydrogen reactant gas that flows into the anode side of the stack. Anode gas flow channels are provided on the anode side of the bipolar plates that allow the anode gas to flow to the anode side of the MEA. The fuel cell stack receives a cathode reactant gas, typically a flow of air forced through the stack by a compressor. Cathode gas flow channels are provided on the cathode side of the bipolar plates that allow the cathode gas to flow to the cathode side of the MEA. Not all of the oxygen is consumed by the stack and some of the air is output as a cathode exhaust gas that may include liquid water as a stack by-product. The bipolar plates may also include flow channels for a cooling fluid. An automotive fuel cell stack, for example, may include about two hundred or more bipolar plates.

SUMMARY OF EXEMPLARY EMBODIMENTS OF THE INVENTION

One embodiment includes a process including coating a first microporous layer onto a first decal and curing the first microporous layer and the first decal.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
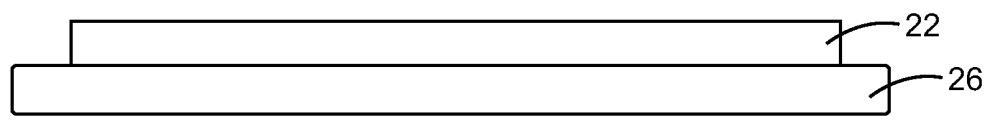
FIG. 1 illustrates a process according to one embodiment.

In one embodiment, a method is provided for fabricating an MEA 25 having microporous layers. Referring to FIG. 1, a decal blank 26 is provided. In one embodiment, the decal blank 26 may be expanded polytetrafluoroethylene (ePTFE), polytetrafluoroethylene (PTFE), or Kapton polyimide film (poly(4,4'-oxydiphenylene-pyromellitimide)) (available from Dupont). Then a first microporous layer 22 is coated onto the decal 26. In one embodiment, the first microporous layer 22 may be coated by using a microporous layer ink. In one embodiment, the first microporous layer 22 may be coated by Meyer rod and then allowed to dry. Next the decal 26 with the first microporous layer 22 may be placed in an oven and cured at a first temperature. In one embodiment, the first temperature may be the glass transition temperature ($T_g$) of a polymer in the microporous layer ink. In one embodiment, the polymer in the microporous layer ink may be a fluoropolymer. After a suitable curing time, for example about 15 minutes to about 60 minutes, the decal 26 with the first microporous layer 22 may be cooled to room temperature.

Figure 2:
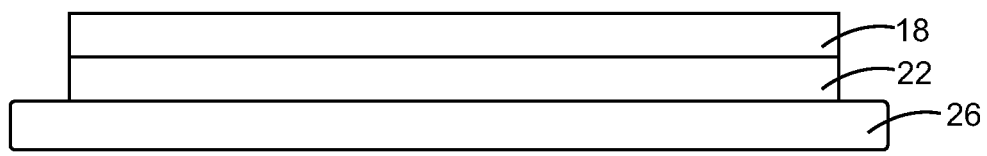
FIG. 2 illustrates a process according to one embodiment.
Figure 3:
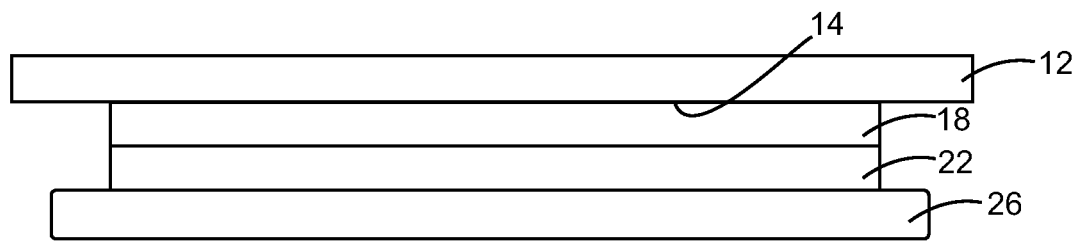
FIG. 3 illustrates a process according to one embodiment.
Figure 4:
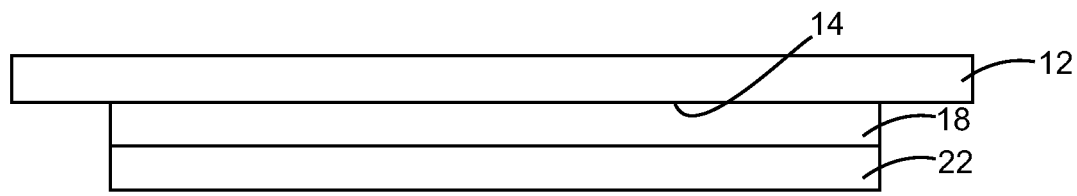
FIG. 4 illustrates a process according to one embodiment.

Referring to FIG. 2, a cathode electrode or cathode catalyst layer 18 is then coated over the first microporous layer 22. The first microporous layer 22 may adhere to the cathode catalyst layer 18. In one embodiment, the catalyst layer 18 may be coated using a catalyst ink. Referring to FIG. 3, a membrane 12 is then provided over the cathode catalyst layer 18. In one embodiment, the membrane 12 may be a polymer electrolyte membrane. The decal 26 with the first microporous layer 22 and the cathode catalyst layer 18 is hot pressed to the membrane 12 such that the cathode catalyst layer 18 is in contact with a first face 14 of the membrane 12. As shown in FIG. 4, the decal 26 then may be peeled away if desired and the first microporous layer 22 and the cathode catalyst layer 18 remain attached to the membrane 12. Conditions of temperature, pressure, and time for hot pressing known in the art may be used. For example, the hot pressing conditions may include a pressing time of 4 minutes at 295° F. and 250 psi.

Figure 5:
FIG. 5 illustrates a process according to one embodiment.

The process just described may then be repeated with a second decal blank 27, a second microporous layer 24, and an anode electrode or anode catalyst layer 20. As shown in FIG. 5, the second microporous layer 24 and the anode catalyst layer 20 may be hot pressed to a second face 16 of the membrane 12. Then the second decal 27 is peeled away. In another embodiment, the decal 26 with the first microporous layer 22 and the cathode electrode 18, and the decal 27 with the second microporous layer 24 and the anode electrode 20, may be simultaneously hot pressed to opposite sides of the membrane 12.

Figure 6:
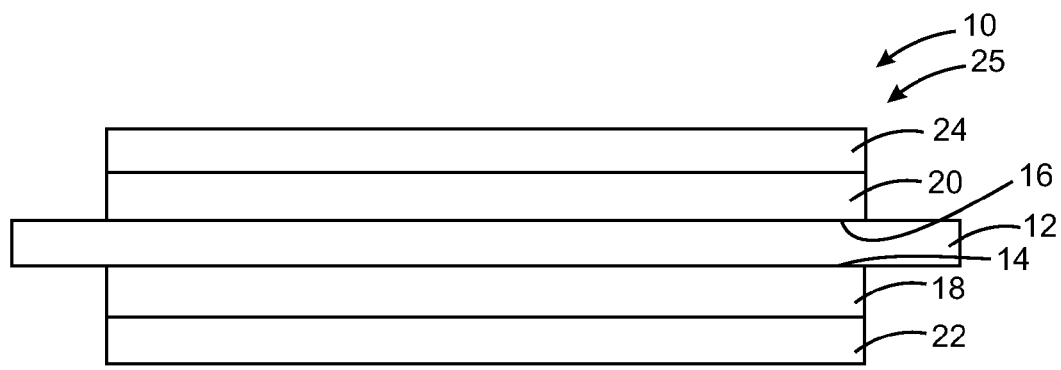
FIG. 6 illustrates a product according to one embodiment.
Figure 7:
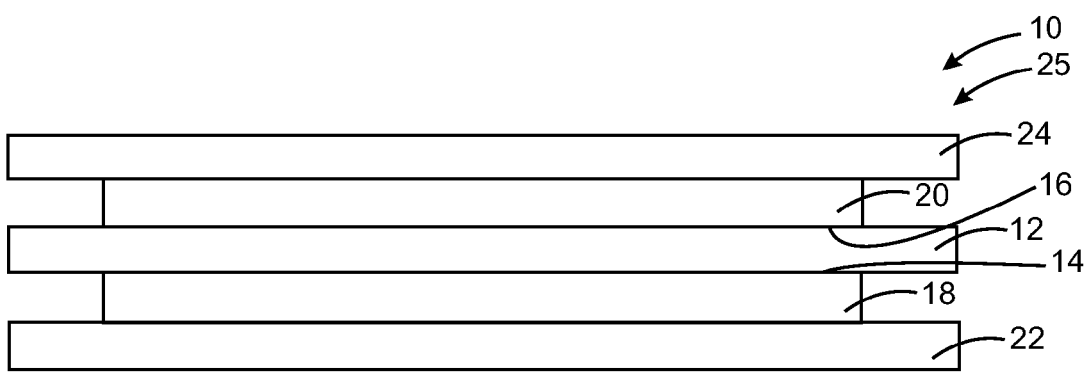
FIG. 7 illustrates a product according to one embodiment.

As shown in FIGS. 6-7, a cross-sectional view of the resulting product 10 shows, starting from the bottom, the first microporous layer 22, the cathode catalyst layer 18, the membrane 12, the anode catalyst layer 20, and the second microporous layer 24. In one embodiment, the thickness of the first and second microporous layers 22, 24 may be about 2 μm to about 100 μm. In another embodiment, the thickness of the first and second microporous layers 22, 24 may be about 15 μm to about 40 μm. FIGS. 6-7 may be described as an MEA 25 with microporous layers 22, 24. Referring to FIG. 6, in one embodiment the membrane 12 may extend past the microporous layers 22, 24 and the catalyst layers 18, 20. Referring to FIG. 7, in one embodiment the membrane 12 and the microporous layers 22, 24 may extend past the catalyst layers 18, 20. In various embodiments, the membrane 12 and the microporous layers 22, 24 may or may not have the same active area. In various embodiments, the electrodes 18, 20 and the microporous layers 22, 24 may or may not have the same active area.

Figure 8:
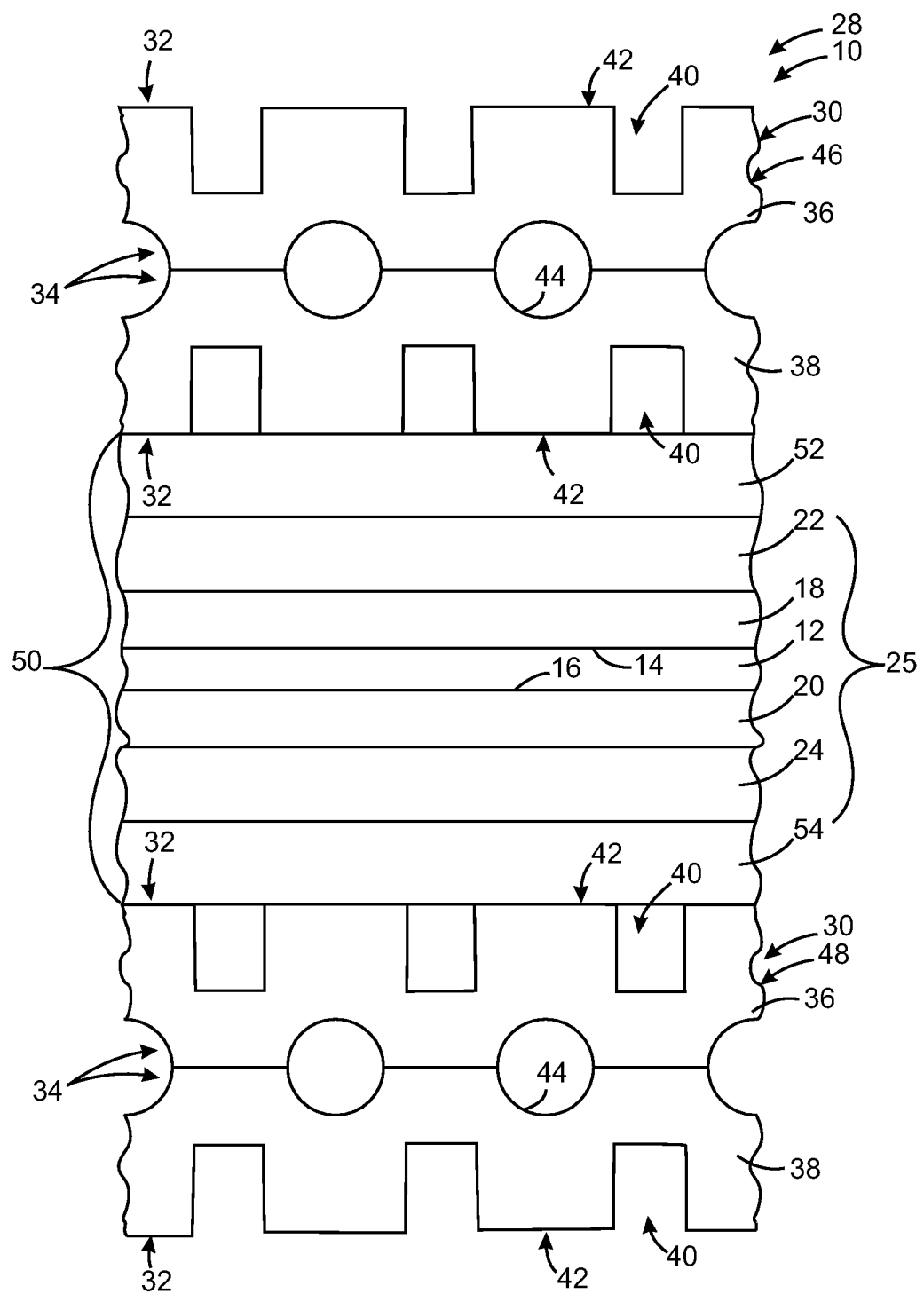
FIG. 8 illustrates a product according to one embodiment.

Referring to FIG. 8, in one embodiment a first gas diffusion media layer 52 may be positioned over the first microporous layer 22, and a second gas diffusion media layer 54 may be positioned over the second microporous layer 24. Referring still to FIG. 8, in one embodiment, the product 10 may be a fuel cell 28 including the MEA 25 with microporous layers 22, 24 adhered to the catalyst layers 18, 20, respectively, as described above. The fuel cell 28 may include at least one bipolar plate 30. The bipolar plate 30 may have a first face 32 and a second face 34. The bipolar plate 14 may include two sheets 36 and 38. The two sheets 38 and 38 may be machined or stamped. The two sheets 36 and 38 may be welded together. A reactant gas flow field comprising flow channels 40 and lands 42 is defined in the first face 32. Cooling fluid flow channels 44 may be provided over the second face 34.

Referring still to FIG. 8, in one embodiment of the invention the fuel cell 28 may include two bipolar plates 30, a first fuel cell bipolar plate 46 and a second fuel cell bipolar plate 48. The bipolar plates 46, 48 may include a variety of materials including, but not limited to, a metal, metal alloy, and/or electrically conductive composite. In one embodiment, the bipolar plates 46, 48 may be stainless steel. In one embodiment, a method includes positioning the first bipolar plate 46 over the first gas diffusion media 52, and positioning the second bipolar plate 48 over the second gas diffusion media 54.

A soft goods portion 50 is provided between the first bipolar plate 46 and the second bipolar plate 48. The soft goods portion 50 may include the polymer electrolyte membrane 12 comprising the first face 14 and the second face 16. The cathode electrode 18 may adhere to the first face 14 of the polymer electrolyte membrane 12, and the first microporous layer 22 may adhere to the cathode electrode 18. The first gas diffusion media layer 52 may overlie the first microporous layer 22. The first gas diffusion media layer 52 may be hydrophobic. The first bipolar plate 46 may overlie the first gas diffusion media layer 52.

The anode electrode 20 may adhere to the second face 16 of the polymer electrolyte membrane 12, and the second microporous layer 24 may adhere to the anode electrode 20. The second gas diffusion media layer 54 may underlie the second microporous layer 24. The second gas diffusion media layer 54 may be hydrophobic. The second bipolar plate 48 may underlie the second gas diffusion media layer 54.

Referring again to the microporous layers 22, 24, in one embodiment the microporous layer 22 or 24 may include a plurality of particles, for example including graphitized carbon or carbon blacks and a binder. In one embodiment the binder may include a hydrophobic agent or polymer such as, but not limited to, polyvinylidene fluoride (PVDF), fluoroethylene propylene (FEP), polytetrafluoroethylene (PTFE), or other organic or inorganic hydrophobic materials. The particles and binder may be included in a liquid phase which may be, for example, a mixture of an organic solvent and water to provide dispersion. In various embodiments, the solvent may include at least one of 2-propanol, 1-propanol or ethanol, etc. In one embodiment, the microporous layers 22, 24 may have a thickness ranging from about 2 to about 100 micrometers, may include 60-90 weight percent particles and 10-40 weight percent binder. The microporous layers 22, 24 may have an average pore size ranging from about 50 nm to about 100 nm.

In another embodiment, a microporous layer ink is formed by mixing the following in a jar mill at 120 rpm with 30 ml grinding media for about 20 hours: 2.4 g acetylene black, 37 ml deionized $H_2O$, 32 ml isopropyl alcohol, and 0.2 g $(NH_4)_2CO_3$. Then 2.21 g of a 36 wt % polyvinylidene fluoride (PVDF) solution in IPA was added to the microporous layer ink. The bottle was then shaken by hand. Then the mixture was coated onto an expanded PTFE decal with a Meyer Rod, size 70. The decal was allowed to air dry and then was placed in an oven preheated to 150° C. and allowed to soak for 1 hour. After curing the polymer, the decal and microporous layer combination was coated with an appropriate catalyst ink and the MEA was fabricated in the traditional decal transfer process. In one embodiment, appropriate substitute materials for acetylene black may include, but are not limited to, XC-72, Black pearls, and Ketjen Black. In another embodiment, appropriate substitute materials for PVDF may include, but are not limited to, any fluorinated polymer that has a melting point below that of the decal material, for example fluorinated ethylenepropylene (FEP) and fluorinated acrylates. In another embodiment, appropriate substitute materials for the pH-adjusting material, $(NH_4)_2CO_3$, may include, but are not limited to, a basic component that does not poison ionomer, for example $NH_4OH$.

Figure 9:
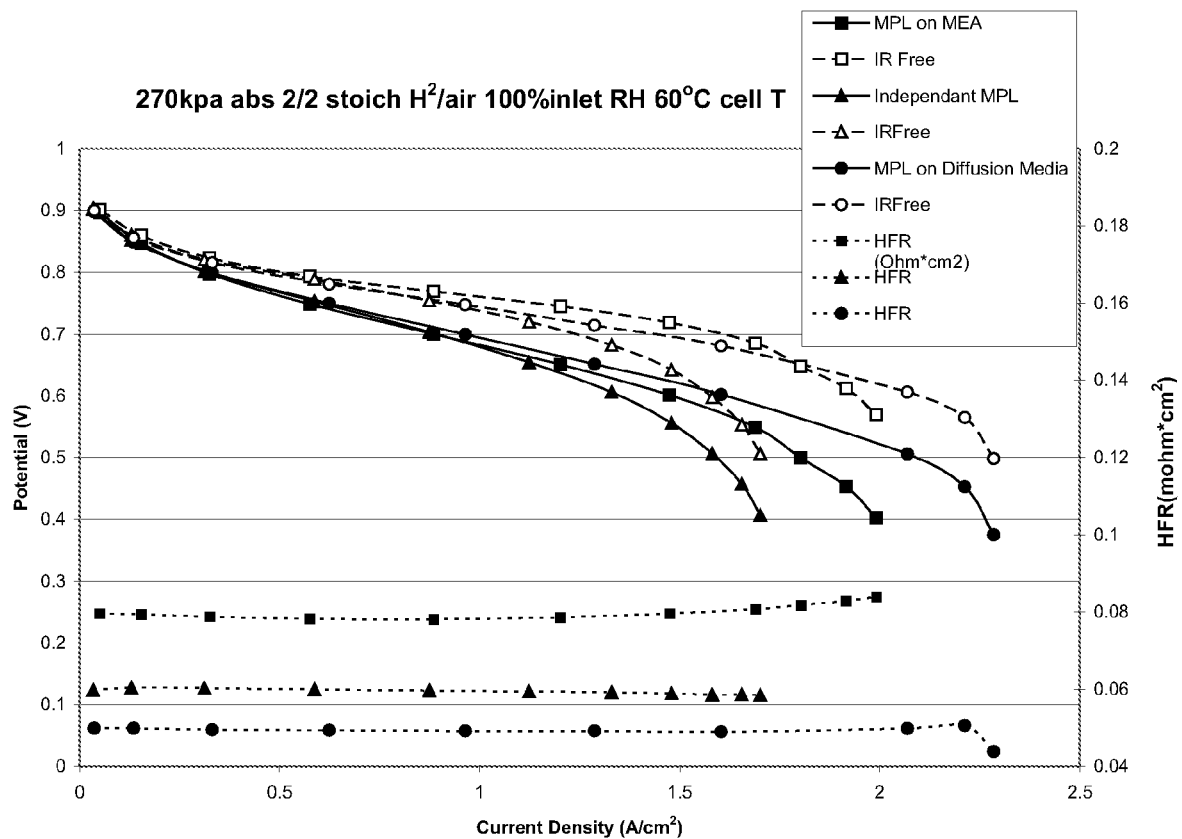
FIG. 9 is a graph of potential versus current density.

FIG. 9 shows a comparison of an embodiment of the invention with other fuel cell arrangements. The polarization curve shown is run on a 50 $cm^2$ platform, and the testing conditions are as follows: 270 kpa absolute, 100% inlet RH, 60° C. cell temperature, and 2/2 stoichiometry of hydrogen and air. This condition is running fully saturated at the inlets and there is liquid water being condensed in the cell as water is being produced; thus this condition stresses the ability of the microporous layer and diffusion media to remove water. The embodiment of the invention represented in FIG. 9 is a fuel cell 28 with the first microporous layer 22 on the MEA 25, and is represented by the lines with square markers. The lines with triangle markers represent a fuel cell with a commercially available freestanding microporous layer. The lines with circle markers represent a fuel cell with the microporous layer formed over the diffusion media layer, which is known in the art. The data points corrected by the high frequency resistance (HFR), which are designated as the "IR Free" curves, show that there is no additional transport resistance for the microporous layer on the MEA compared with the microporous layer on the diffusion media layer. As shown in FIG. 9, the fuel cell with the microporous layer on the MEA performs as well as the fuel cell with the microporous layer on the diffusion media up to a current density of about 1.2 A/cm$^2$ and performs better than the commercially available freestanding microporous layer at a current density greater than 1.2 A/cm$^2$.

During fuel cell operation, many stresses may be placed upon the MEA 25. For example, the MEA may take up water, stretch, shrink, compress, feel tension, and so forth. In one embodiment, the microporous layers 22, 24 may add durability to the MEA 25 or the fuel cell 28 when the catalyst layers 18, 20 are coated directly over the microporous layers 22, 24. The microporous layers 22, 24 may lend mechanical support to the MEA 25. In other embodiments, the microporous layers 22, 24 may slow down the drying-out process of the MEA 25 and may protect the MEA 25 from catastrophic failure. The microporous layers 22, 24 may protect the membrane 12 from being punctured by fibers from the diffusion media layers 52, 54. In another embodiment, the catalyst layers 18, 20 coated over the microporous layers 22, 24 may contribute to water management within the fuel cell 28 by creating a tight interface without voids. This may aid in water removal from the fuel cell 28.

In various embodiments, the membrane 12 may comprise a variety of different types of membranes. In one embodiment, the membrane 12 may be a perfluorinated sulfonic acid polymer electrolyte in which the entire membrane structure has ionic exchange characteristics. These membranes are commercially available, and a typical example of a commercial sulfonic perfluorocarbon proton conductive membrane is sold by E. I. DuPont D Nemours & Company under the trade designation NAFION. Other such membranes are available from Asahi Glass and Asahi Chemical Company. The use of other types of membranes 12, such as, but not limited to, perfluorinated cation-exchange membranes, hydrocarbon based cation-exchange membranes as well as anion-exchange membranes are also within the scope of the invention.

In one embodiment, the first gas diffusion media layer 52 or the second gas diffusion media layer 54 may include any electrically conductive porous material. In various embodiments, the gas diffusion media layer 52 or 54 may include non-woven carbon fiber paper or woven carbon cloth which may be treated with a hydrophobic material, such as, but not limited to, polymers of polyvinylidene fluoride (PVDF), fluoroethylene propylene, or polytetrafluoroethylene (PTFE). The gas diffusion media layer 52 or 54 may have an average pore size ranging from 5 to 40 μm. The gas diffusion media layer 52 or 54 may have a thickness ranging from about 100 to about 500 μm.

In one embodiment, the cathode electrode 18 and the anode electrode 20 (cathode layer and anode layer) may be catalyst layers which may include catalyst particles such as platinum, and an ion conductive material such as a proton conducting ionomer, intermingled with the particles. The proton conductive material may be an ionomer such as a perfluorinated sulfonic acid polymer. The catalyst materials may include metals such as platinum, palladium, and mixtures of metals such as platinum and molybdenum, platinum and cobalt, platinum and ruthenium, platinum and nickel, platinum and tin, other platinum transition-metal alloys, and other fuel cell electrocatalysts known in the art. The catalyst materials may be finely divided if desired. The catalyst materials may be unsupported or supported on a variety of materials such as, but not limited to, finely divided carbon particles.

When the terms "over", "overlying", "overlies", or "under", "underlying", "underlies" are used with respect to the relative position of a first component or layer with respect to a second component or layer, such shall mean that the first component or layer is in direct contact with the second component or layer, or that additional layers or components are interposed between the first component or layer and the second component or layer.

The above description of embodiments of the invention is merely exemplary in nature and, thus, variations thereof are not to be regarded as a departure from the spirit and scope of the invention.

What is claimed is:

1. A process comprising;
coating a first microporous layer onto a first transfer decal, the first microporous layer comprising a polymeric binder and at least one of carbon black or graphitized carbon; and
curing the first microporous layer onto the first decal, and thereafter peeling the first transfer decal away from the cured first microporous layer.

2. A process as set forth in claim 1 wherein the decal comprises a polymer.

3. A process as set forth in claim 1 wherein the decal comprises expanded polytetrafluoroethylene film.

4. A process as set forth in claim 1 wherein the decal comprises a polytetrafluoroethylene film.

5. A process as set forth in claim 1 wherein the decal comprises a polyimide film.

6. A process comprising:
coating a first microporous layer onto a first transfer decal, the first microporous layer comprising a polymeric binder and at least one of carbon black or graphitized carbon;
curing the first microporous layer onto the first decal; and
coating a first catalyst layer over the first microporous layer so that the first catalyst layer is adhered to the first microporous layer.

7. A process as set forth in claim 6 further comprising;
providing a membrane comprising is first face and a second face; and
hot pressing the first microporous layer and the first catalyst layer to the first face of the membrane.

8. A process as set forth in claim 7 further comprising:
coating a second microporous layer onto a second transfer decal;
curing the second microporous layer and the second decal;
coating a second catalyst layer over the second microporous layer; and
hot pressing the second microporous layer and the second catalyst layer to the second face of the membrane.

9. A process as set forth in claim 7 wherein the membrane comprises a polymer electrolyte membrane.

10. A process as set forth in claim 6 further comprising:
coating a second microporous layer onto a second decal;
curing the second microporous layer and the second decal;
coating a second catalyst layer over the second microporous layer;
providing a membrane comprising a first face and a second face; and
simultaneously hot pressing the first microporous layer and the first catalyst layer to the first face of the membrane, and the second microporous layer and the second catalyst layer to the second face of the membrane.

11. A process as set forth in claim 10 wherein the first decal and the second decal comprise one of expanded polytetrafluoroethylene (ePTFE), polytetrafluoroethylene (PTFE), or poly(4,4'-oxydiphenylene-pyromellitimide).

12. A process as set forth in claim 10 wherein the second microporous layer and the second decal are cured at the glass transition temperature of a polymeric binder in the second microporous layer.

13. A process as set forth in claim 10 wherein the first and second catalyst layers comprise catalyst particles and an ion conductive material.

14. A process as set forth in claim 10 wherein the second microporous layer comprises at least one of carbon black or graphitized carbon.

15. A process as set forth in claim 10 further comprising:
removing the first decal and providing a first gas diffusion media layer over the first microporous layer;
providing a first bipolar plate over the first as diffusion media layer, wherein the first bipolar plate includes a plurality of lands and channels;
removing the second decal and providing a second gas diffusion media layer over the second microporous layer; and
providing a second bipolar plate over the second gas diffusion media layer, wherein the second bipolar plate includes a plurality of lands and channels.

16. A process as set forth in claim 15 wherein the first microporous layer is free of an ionomer.

17. A process as set forth in claim 6 wherein the first microporous layer further comprises a hydrophobic agent.

18. A process as set forth in claim 17 wherein the hydrophobic agent comprises a fluorocarbon.

19. A process as set forth in claim 6 wherein the first microporous layer is free of a metal catalyst.

20. A process as set forth in claim 6 wherein the curing comprises heating the first microporous layer and first decal in an oven.

21. A process comprising:
coating a first microporous layer onto a first transfer decal, the first microporous layer comprising a polymeric binder and at least one of carbon black or graphitized carbon; and
curing the first microporous layer onto the first decal, wherein the first microporous layer and the first decal are cured at the glass transition temperature of the binder in the first microporous layer.

22. A process comprising:
coating a first microporous layer onto a first peelable transfer decal film, the first microporous layer comprising a polymeric binder and at least one of carbon black or graphitized carbon; and
curing the first microporous layer onto the first decal, and thereafter peeling the first transfer decal away from the cured first microporous layer.

23. A process as set forth in claim 22 wherein the decal comprises a polymer.

24. A process as set forth in claim 22 wherein the decal comprises expanded polytetrafluoroethylene film.

25. A process as set forth in claim 22 wherein the decal comprises a polytetrafluoroethylene film.

26. A process as set forth in claim 22 wherein the decal Comprises a polyimide film.

* * * * *